United States Patent
Craig et al.

(10) Patent No.: US 10,309,221 B2
(45) Date of Patent: Jun. 4, 2019

(54) END COUPLING FOR A ROCK BOLT

(71) Applicant: FCI Holdings Delaware, Inc., Wilmington, DE (US)

(72) Inventors: Peter Harold Craig, Cooyal (AU); Matthew Raffaele Holden, Cecil Hills (AU)

(73) Assignee: FCI Holdings Delaware, Inc., Wilmington, DE (US)

( * ) Notice: Subject to any disclaimer, the term of this patent is extended or adjusted under 35 U.S.C. 154(b) by 0 days.

(21) Appl. No.: 15/522,313

(22) PCT Filed: Oct. 28, 2015

(86) PCT No.: PCT/AU2015/000645
§ 371 (c)(1),
(2) Date: Apr. 27, 2017

(87) PCT Pub. No.: WO2016/065398
PCT Pub. Date: May 6, 2016

(65) Prior Publication Data
US 2017/0314394 A1    Nov. 2, 2017

(30) Foreign Application Priority Data

Oct. 28, 2014  (AU) ............................... 2014904317
Mar. 5, 2015   (AU) ............................... 2015900780

(51) Int. Cl.
*E21D 21/00* (2006.01)
*E21D 20/02* (2006.01)
(Continued)

(52) U.S. Cl.
CPC ....... *E21D 21/008* (2013.01); *E21D 21/0033* (2013.01); *E21D 21/0093* (2013.01);
(Continued)

(58) Field of Classification Search
CPC .... E21D 21/008; E21D 21/0033; E21D 20/02
See application file for complete search history.

(56) References Cited

U.S. PATENT DOCUMENTS 4,303,354 A * 12/1981 McDowell, Jr. ...... E21D 21/008
405/259.5
4,349,299 A *  9/1982 Eny ....................... E21D 21/008
405/259.6
(Continued)

FOREIGN PATENT DOCUMENTS

AU       2012100916 A4    8/2012
AU       2012202298 A1   11/2012
(Continued)

*Primary Examiner* — Benjamin F Fiorello
(74) *Attorney, Agent, or Firm* — The Webb Law Firm

(57) ABSTRACT

An end coupling for a rock bolt having a shaft having an external thread, the coupling having an axis and the coupling comprising a body having a leading end and a trailing end spaced apart along the axis, a first passage portion extending along the axis from the leading end; a second passage portion extending along the axis from the trailing end; the first passage portion including a first thread portion to threadingly engage the external thread on the shaft of the rock bolt; the second passage portion including a drive receiving portion arranged to be engaged with a drive inserted into the second passage portion via the trailing end to impart rotation to the coupling about the axis.

19 Claims, 10 Drawing Sheets

(51) Int. Cl.
*F16B 5/02* (2006.01)
*F16B 13/14* (2006.01)
(52) U.S. Cl.
CPC ............ *E21D 20/02* (2013.01); *F16B 5/0275* (2013.01); *F16B 13/141* (2013.01)

(56) References Cited

U.S. PATENT DOCUMENTS

| | | | | |
|---|---|---|---|---|
| 4,618,291 | A * | 10/1986 | Wright | B25B 13/065 405/259.2 |
| 7,001,109 | B2 * | 2/2006 | Mongrain | E21D 20/025 405/259.1 |
| 7,625,155 | B1 * | 12/2009 | McKinney | E21D 21/008 405/259.1 |
| 8,172,485 | B2 | 5/2012 | Craig | |
| 2004/0135422 | A1 * | 7/2004 | Wallstein | E21D 21/008 299/31 |
| 2006/0093438 | A1 * | 5/2006 | Fergusson | E21D 20/02 405/259.3 |
| 2009/0191007 | A1 * | 7/2009 | Seegmiller | E21D 21/008 405/259.5 |

FOREIGN PATENT DOCUMENTS

| | | |
|---|---|---|
| CN | 103410829 A | 11/2013 |
| EP | 0476158 A1 | 3/1992 |

\* cited by examiner

END COUPLING FOR A ROCK BOLT

CROSS-REFERENCE TO RELATED APPLICATIONS

This application is the United States national phase of International Application No. PCT/AU2015/000645 filed Oct. 28, 2015, and claims priority to Australian Patent Application Nos. 2014904317 and 2015900780, filed Oct. 28, 2014, and Mar. 5, 2015, respectively, the disclosures of which are hereby incorporated in their entirety by reference.

TECHNICAL FIELD

The present disclosure relates generally to threaded end couplings and more specifically, but not exclusively, to end couplings for rock bolts and rock bolt assemblies incorporating such end couplings.

BACKGROUND OF THE INVENTION

Roof and wall support is vital in mining and tunneling operations. Mine and tunnel walls and roofs consist of rock strata, which must be reinforced to prevent the possibility of collapse. Rock bolts are widely used for consolidating the rock strata.

In conventional strata support systems, a bore is drilled into the rock by a drill rod, which is then removed and a rock bolt is then installed in the drilled hole and secured in place typically using a resin or cement based grout. The rock bolt is tensioned which allows consolidation of the strata by placing that strata in compression. The rock bolt is typically formed from a steel rod.

To allow the rock bolt to be tensioned, the end of the bolt may be anchored mechanically to the rock formation by engagement of an expansion assembly on the end of bolt with the rock formation. Alternatively, the bolt may be adhesively bonded to the rock formation with a resin bonding material inserted into the bore hole. Alternatively, a combination of mechanical anchoring and resin bonding can be employed by using both an expansion assembly and resin bonding material.

In some environments it is preferable that there is little or no tail protruding from the rock face. This is problematic as it makes it difficult to rotate the installed bolt to effect adequate mixing of the resin or grout and to subsequently tension the bolt once the resin/grout has set.

SUMMARY

According to a first aspect, disclosed is an end coupling for a rock bolt having a shaft having an external thread, the coupling having an axis and the coupling comprising: a body having a leading end and a trailing end spaced apart along the axis; a first passage portion extending along the axis from the leading end; a second passage portion extending along the axis from the trailing end; the first passage portion including a first thread portion to threadingly engage the external thread on the shaft of the rock bolt; the second passage portion including a drive receiving portion arranged to be engaged with a drive inserted into the second passage portion via the trailing end to impart rotation to the coupling about the axis.

According to a second aspect, disclosed is a rock bolt assembly comprising: a rock bolt having a shaft having an external thread, and an end coupling according to the first aspect, an end of the rock bolt disposed in the first passage portion and threadingly engaged with end coupling.

BRIEF DESCRIPTION OF THE DRAWINGS

Embodiments will now be described by way of example only, with reference to the accompanying drawings in which.

DETAILED DESCRIPTION

Figure 1:
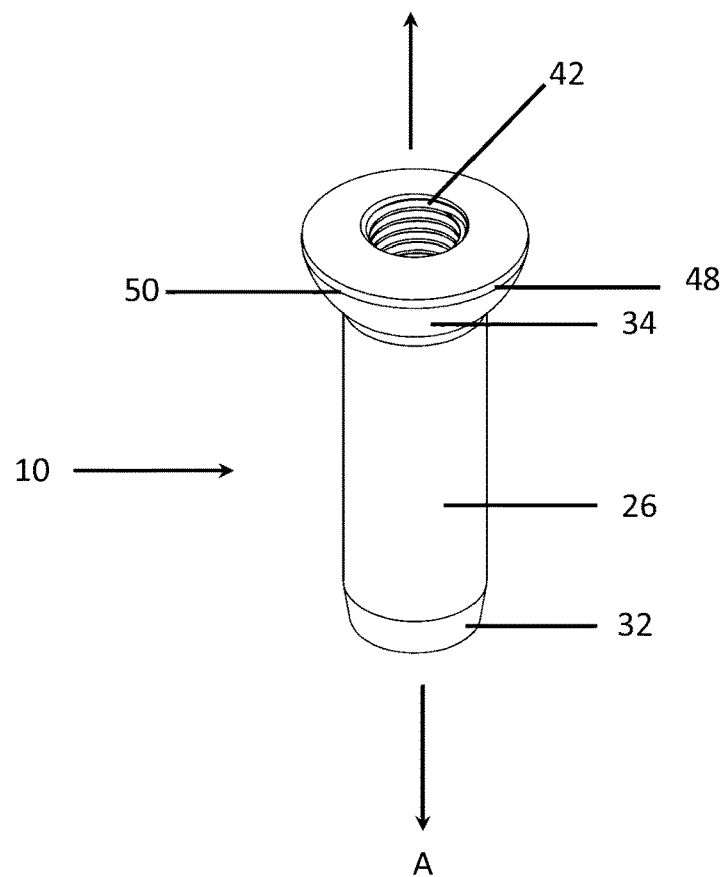
FIG. 1 is an isometric view of an embodiment of an end coupling.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Disclosed is an end coupling for a rock bolt having a shaft having an external thread, the coupling having an axis and the coupling comprising: a body having a leading end and a trailing end spaced apart along the axis, a first passage portion extending along the axis from the leading end; a second passage portion extending along the axis from the trailing end; the first passage portion including a first thread portion to threadingly engage the external thread on the shaft of the rock bolt; the second passage portion including a drive receiving portion arranged to be engaged with a drive inserted into the second passage portion via the trailing end to impart rotation to the coupling about the axis.

Accordingly, an end coupling according to the above form is arranged to receive the end portion of shaft within the first passage portion. With this arrangement the shaft may be threadingly engaged with the coupling whilst a portion of the body, in which the drive receiving portion may be disposed to receive a drive to rotate the shaft, may extend beyond the end of the shaft.

In one form, the coupling body has a low profile thereby allowing it to locate in a bore containing the shaft without requiring any, or only minimal, enlarging of the bore. In rock bolting applications, there is typically an annular space of approximately 3-8 mm thickness between the bore wall and a rock bolt shaft to allow adequate passage of grout/resin. Accordingly if the lead portion is sufficiently slim, the coupling can locate in the bore without requiring enlargement of the whole utilising this gap. In a particular form, the lead portion has a generally cylindrical outer surface having a maximum radial displacement from the axis which is not more than 30% greater than the nominal radius of the shaft A feature of the end coupling according to the above aspect is that the drive receiving portion is disposed within the second passage portion. This arrangement has particular benefit as it obviates the need for a protruding drive end to be mounted on the end coupling thereby enabling a lower profile arrangement to be provided at the rock surface when a rock bolt including the end coupling is installed.

In some forms, the second passage portion includes a second thread portion arranged to receive an attachment with a complementary thread received in the trailing end to threadingly engage the attachment to the end coupling. The attachment may take various forms and may for example be a hanger (for fixing mine services conduits or safety mesh) or a load tester to allow testing to ensure the bolt is correctly installed.

In some forms, the second thread portion is disposed intermediate the drive receiving portion and the trailing end. With such an arrangement, the second thread portion is readily accessible to the trailing end. Furthermore, the driving receiving portion is disposed well within the second passage which allows for more secure and safer coupling of the drive to the end coupling. To allow for ready access to the drive receiving portion, in some forms the drive receiving portion is disposed radially inwardly of the second thread portion. In one form, the drive receiving portion is in the form of an internal hex or other no circular profile.

In some forms, the second thread portion extends to the trailing end.

In some forms, the drive receiving portion is disposed at or adjacent the trailing end. With such an arrangement, the second passage portion may also include a thread receiving portion but in this arrangement it is included inboard from the drive receiving portion from the trailing end.

In some forms, the first and second passage portions are interconnected to form a continuous passage between the leading and trailing end of the body. In an alternative form, these passage portions may be separated by an interruption (which may be solid or which may reduce the diameter of the passage).

In an arrangement where the drive receiving portion is disposed at or adjacent the trailing end, and the first and second passages are continuous and both include threaded portions, those threaded portions may also be continuous.

In a particular form, an abutment arrangement disposed on the body and forming an external abutment surface that faces the leading end. In some forms, the abutment arrangement is disposed at or proximate the trailing end and may be formed as an enlarged head on the coupling body. The purpose of the abutment arrangement is to provide an arrangement that either directly or indirectly abuts against the rock surface.

In one form, the head of the end coupling is formed as a countersink arrangement with bevelled edge surfaces. In a particular form, the end coupling further comprises a washer which is shaped to receive the head therewithin in a countersunk arrangement. The purpose of the washer is to allow better transfer of loading from the end coupling to the rock surface by providing a larger contacting surface (typically via a plate disposed on the rock bolt and which engages with the rock surface)

In some forms in use the rock bolt is threadingly engaged with the end coupling such that when in a first position, rotation of the end coupling in one direction relative to the shaft allows for tensioning of rock bolt when installed by relative axial movement between the end coupling and the rock bolt shaft.

In some forms, the end coupling is required, in addition or as an alternative to tensioning of the bolt against the rock surface, to instigate rotation of the bolt (to activate a mechanical anchor or burst and mix resin disposed in a resin cartridge). To allow the end coupling to impart rotation to the shaft, it is necessary that there is some mechanism for torque to be transferred between the end coupling and the shaft.

In some forms, a torque transfer arrangement is provided that is arranged to allow a threshold torque to be applied to the shaft through the coupling without inducing relative rotation between the coupling and the shaft In one form, the torque transfer arrangement is in the form of shear pin. The shear pin may arranged to extend through the coupling into the shaft, or alternatively may extend across the passage in the coupling to form a stop in the passage. In other forms, the torque transfer arrangement may be in the form of an adhesive in the threaded coupling between the shaft and coupling, or a plug (such as a polymeric plug) disposed in the first passage portion of the coupling body. With any of these arrangements, when the torque transfer is active, the coupling is able to impart torque up to a threshold level under rotation of the coupling in a first direction as the torque transfer arrangement acts as a stop and prevents any relative rotation between coupling and shaft. However, at torque levels above the threshold, the torque transfer arrangement fail (e.g. by failing of the shear pin) thereby allowing the coupling to move axially along the shaft under continued rotation in the first direction There is also disclosed a rock bolt assembly comprising: a rock bolt having a shaft having an external thread, and an end coupling according to any form disclosed above, an end of the rock bolt disposed in the first passage portion and threadingly engaged with end coupling.

In some forms the assembly further comprising a torque transfer arrangement (as disclosed in any form above) arranged to allow a threshold torque to be applied to the shaft through the coupling without inducing relative rotation between the coupling and the shaft.

In some forms, the rock bolt assembly has a second thread portion disposed in the second passage portion that is accessible from the trailing end to receive an attachment having a complementary thread to threadingly engage the attachment to the rock bolt assembly.

Referring to the FIGS. 1 to 8, disclosed is an end coupling 10 for a rock bolt 12. The rock bolt 12 has a shaft 14 which has an external thread 16. The external thread 16 extends along an end portion 18 of the shaft 14. The coupling 10 is arranged to be coupled to the external thread 16 and is adapted in one mode to allow rotation to be imparted to the shaft 14 when it is located in a bore 20 formed in rock 22 with little or no shaft tail protruding from the rock face 24. in another mode, the coupling 10 is able to be advanced along the shaft 12 under rotation of the coupling relative to the shaft.

Figure 2:
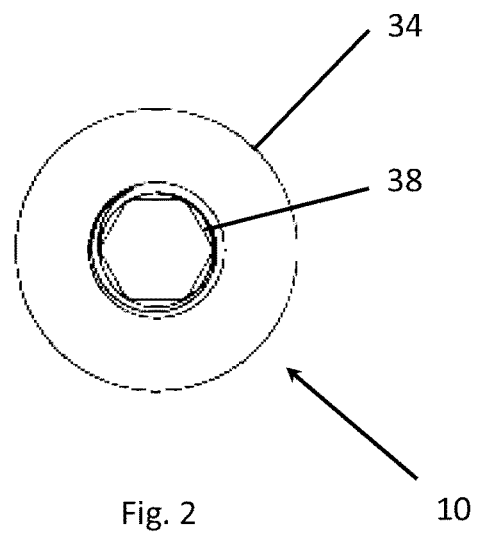
FIG. 2 is a trailing end view of the end coupling of FIG. 1.
Figure 3:
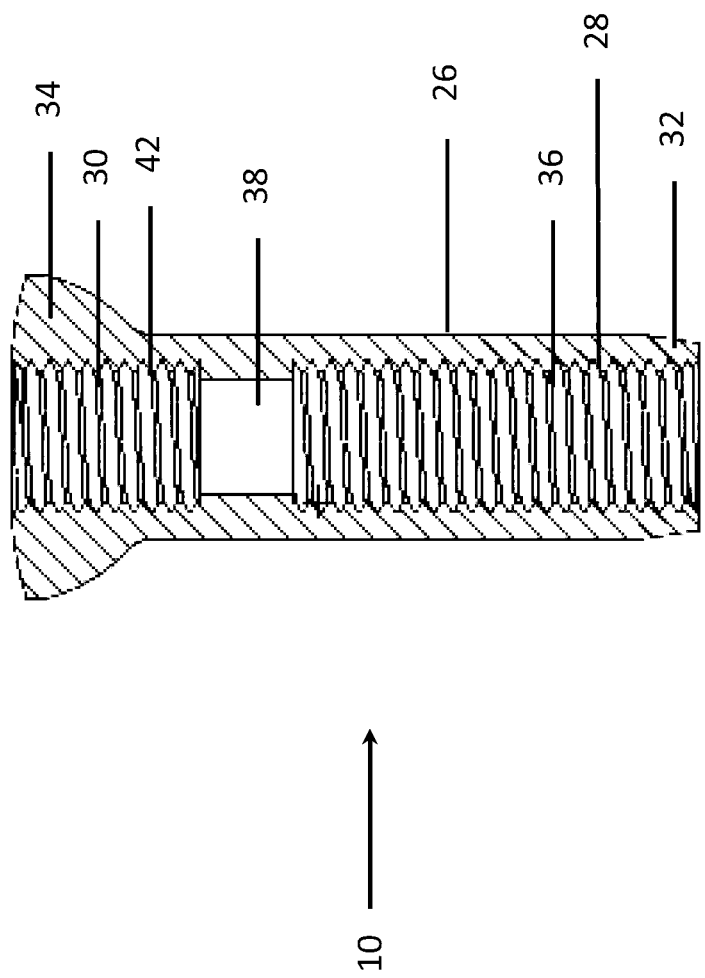
FIG. 3 is a cross-sectional view of the end coupling of FIG. 1.

Referring to FIGS. 1 to 3, the coupling 10 is illustrated. The coupling 10 is elongate and extends in a longitudinal direction along an axis A.

The coupling 10 includes a body 26 having a leading end 32 and a trailing end 34 spaced apart along the axis A. The body 26 further defines a first passage portion 28 and a second passage portion 30 extending along the axis A. The first passage portion 28 extends along the axis A from the leading end 32. The first passage portion 28 has an internal diameter and at least a portion of the first passage portion 28 is internally threaded with a first thread portion 36. The thread 36 allows the first passage portion 28 to threadingly engage the external thread 16 on the shaft 14 of the rock bolt 12. Hence, this allows the end portion 18 of the shaft 14 to be threadedly engaged with the end coupling 10.

The second passage portion 30 extends along the axis A from the trailing end 34. The second passage portion 30 includes a drive receiving portion 38 arranged to be engaged with a drive 40 inserted in the second passage portion 30 via the trailing end 34 to impart rotation to the coupling 10 about the axis A. In the illustrated embodiment of FIGS. 1-3, the second passage portion 30 includes a second thread portion 42 arranged to receive an attachment 44 (as for example shown in FIGS. 7 and 8) with a complementary thread 46 received in the trailing end 34 to threadingly engage the attachment 44 to the end coupling 10.

In this illustrated embodiment, the first and second passage portions 28, 30 are interconnected to form a continuous passage between the leading and trailing end 32, 34 of the body 26. In alternative embodiments (not shown), the first and second passage portions may be disconnected between the leading and trailing end and separated by an interruption.

The arrangement of the end coupling 10 allows end portion 18 of the shaft 14 to be threadingly engaged with the first passage portion 28 of the end coupling 1 while the second passage portion 30 of the coupling 10 extends beyond the end of the shaft 14. Hence, the second passage portion 30 is accessible for engagement with the drive 40 (see FIG. 6) which may be mounted via the trailing end 34 to rotate the shaft 14. This allows for the shaft 14 to be positioned within the bore 20 having little to no tail protruding from the rock face but still allows the coupling 10 to input torque to the shaft 14 and tensioning of the rock bolt 12 as will be described in more detail below.

In the illustrated embodiment of FIGS. 1-3, the second thread portion 42 is disposed intermediate the drive receiving portion 38 and the trailing end 34. The second thread portion 38 also extends to the trailing end 34. In alternative embodiments, the drive receiving portion may also be positioned intermediate the trailing end and the second thread portion. In this latter arrangement the drive receiving portion may be disposed at the trailing end 34. Such an arrangement is disclosed in FIGS. 9-11 which is described in more detail below.

As best shown in FIG. 2, the drive receiving portion 42 is in the form of an internal hex, which is disposed radially inwardly of the second thread portion 42. In alternative embodiments, the drive receiving portion may be in any suitable form provided the drive receiving portion is capable of engaging with a drive to impart rotation to the coupling about the axis.

The coupling 10 also includes an abutment arrangement 48 disposed on the body 26 and forms an external abutment surface 50 that faces the leading end 32. The abutment arrangement 48 is disposed at or proximate the trailing end 34. The abutment arrangement includes a bevelled surface 52 that faces the leading end 32. In other words, the coupling 10 tapers from the trailing end 34 so that the trailing end 34 forms an enlarged head relative to the major portion of the body 26. The illustrated abutment arrangement 48 is designed to form a countersunk configuration and be low profile when the coupling 10 is located in the bore 20 formed in the rock 22 with little or no trailing end 34 protruding from the rock face 24.

In the illustrated embodiment, the abutment arrangement 48 is integrally formed with the body, but may be formed separately and attached to the body (say by a separate screw threaded coupling arrangement).

Figure 4:
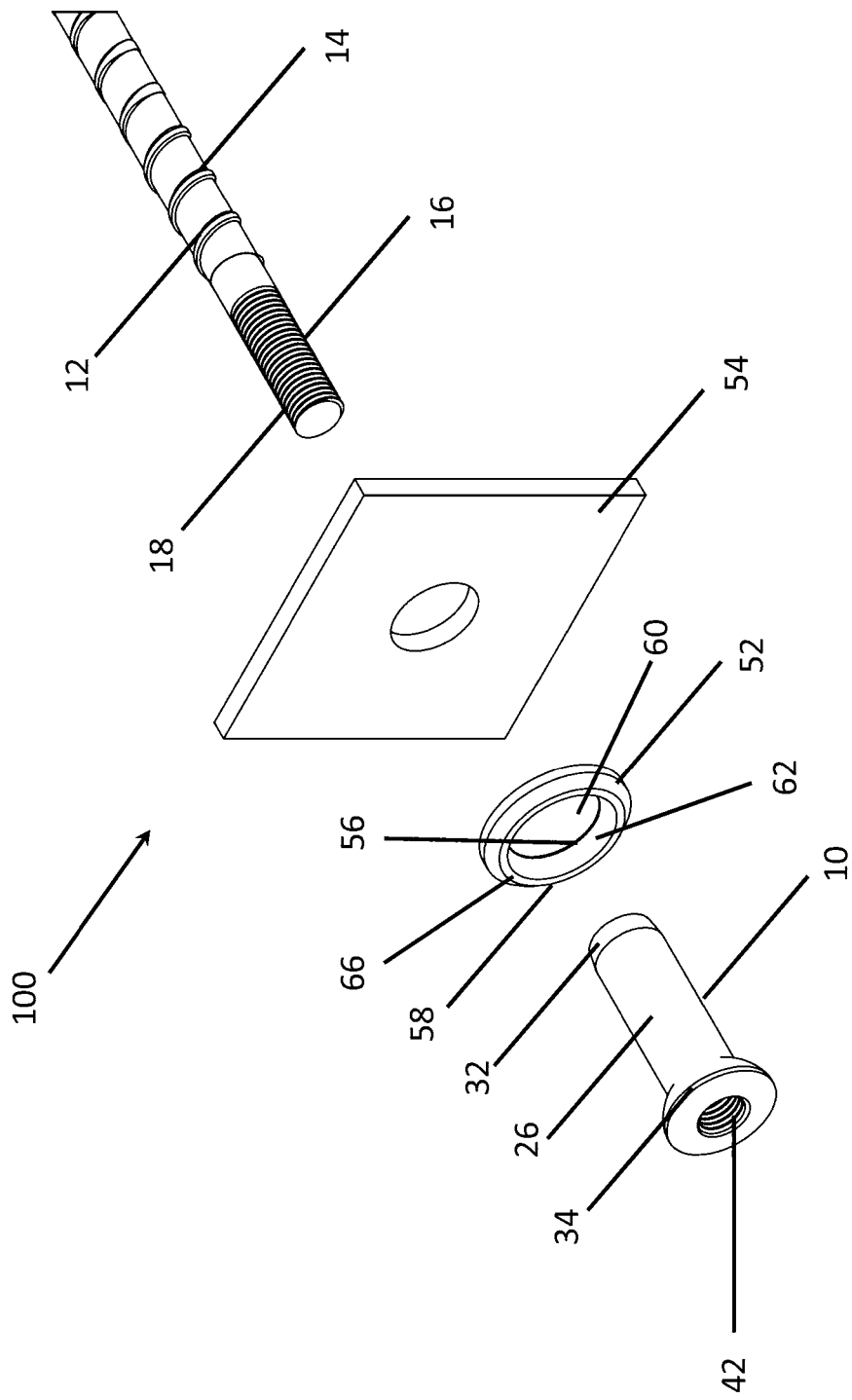
FIG. 4 is an exploded view of an embodiment of a rock bolt assembly including the end coupling of FIG. 1.

Turning to FIG. 4, a rock bolt assembly 100 is shown in an exploded view comprising the coupling 10, a washer 52, a plate 54, and the shaft 14 of the rock bolt 12.

The washer 52 is receivable on the body 26 of the coupling 10 and arranged to locate against the abutment arrangement 48. The washer 52 also has a leading face 56 and a trailing face 58 and defines an aperture 60 extending between the leading face 56 and the trailing face 58. The washer 48 also includes an internal surface 62 forming the wall of the aperture 60. The internal surface 62 is shaped to complement the countersunk abutment arrangement 48 of the coupling 10 such that the enlarged head fits within the washer 48. In this regard, the trailing face 58 of the washer 48 is arranged to locate against the abutment arrangement 48.

The leading face 56 of the washer is arranged to locate against the plate 54 and includes abutment surface 64 that locates against the plate 54. In the illustrated embodiment, the abutment surface 64 of the washer and the plate are both substantially flat to allow a broad contact area to facilitate load transfer from the coupling to the plate. In this way the washer increases the contacting surface against the plate. In use, the combination of and fit between the plate 54, the abutment surface 64 of the washer, the internal surface 62 of the washer and the abutment arrangement 48 of the coupling allows for more effective load transfer from the end coupling through to the plate 54 in a low profile arrangement.

In alternative embodiments, the washer may include a convex leading end. In this regard, the washer may be in the form of a dome washer, and the plate may be in the form of a volcano plate. The dome leading end fits within the volcano plate to allow for any alignment adjustment during tensioning of the rock bolt assembly, as well as to accommodate maximum effective load transfer.

In the illustrated embodiment, the washer is formed separately to the coupling, but is formed so as to be a complementary low profile shape to the end coupling. Advantageously, the same size washer may be used on various sized rock bolts and in combination with various types of end couplings. This provides cost effective and flexible manufacturing options. In alternative embodiments, the washer is integrally formed with the body of the coupling.

Figure 5:
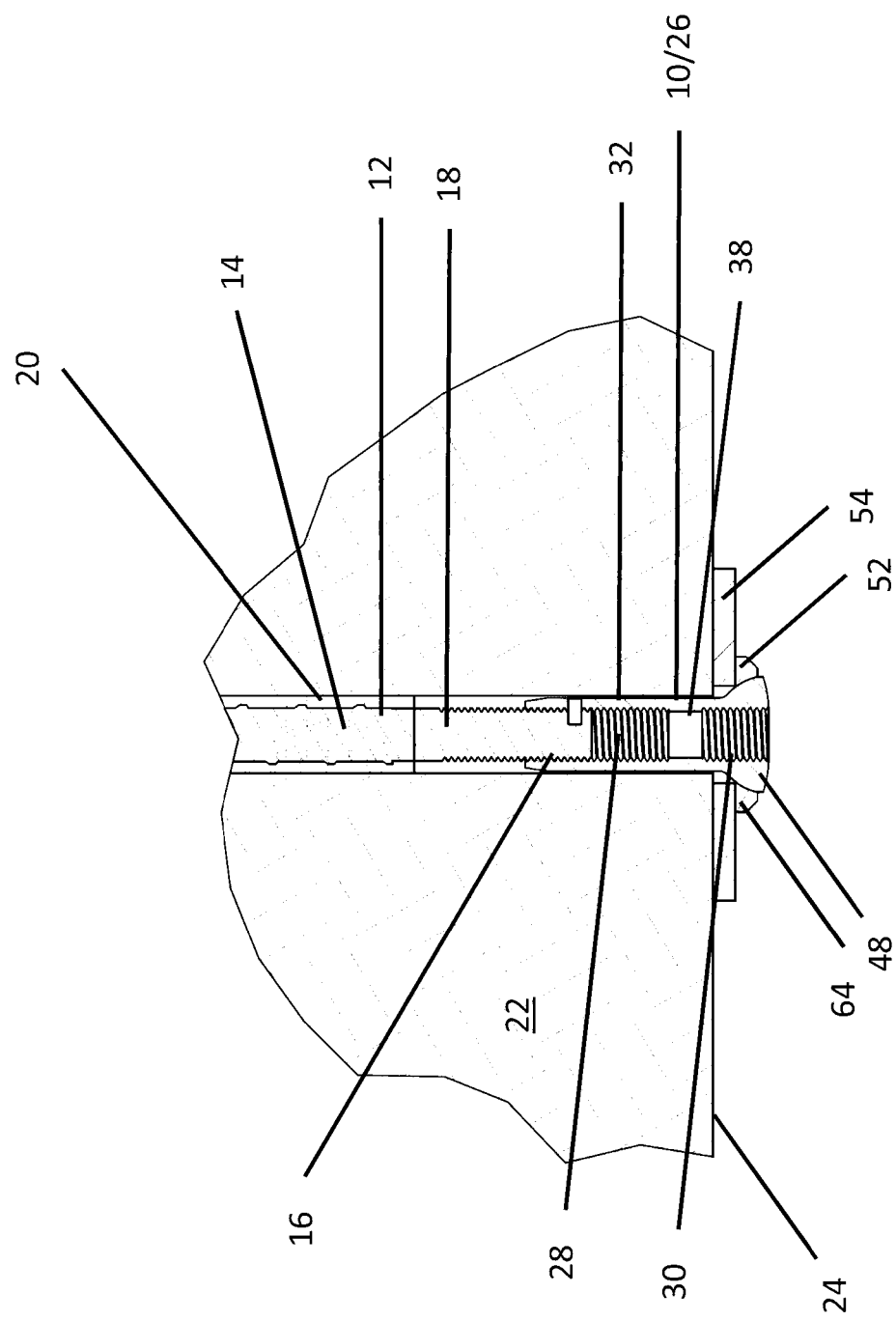
FIG. 5 is cross-sectional view of the rock bolt assembly of FIG. 4 in use.

Illustrated in FIG. 5, the rock bolt assembly 100 is shown comprising the coupling 10 assembled on the shaft 14. The end portion 18 of the rock bolt 12 is disposed in the first passage portion 28 and threadingly engaged with end coupling 10.

The assembly 100 includes a torque transfer arrangement 68 that is arranged to allow a threshold torque to be applied to the shaft 14 through the coupling 10 without inducing relative rotation between the coupling 10 and the shaft 14. In the illustrated embodiment, the torque transfer arrangement 68 is in the form of a shear pin 68. It is understood that the torque transfer arrangement may also be in the form of a stop, a plug, an adhesive (e.g., adhesive sold under the trade name LOCTITE), or any other suitable form of arrangement which prevents relative rotation between the coupling and the shaft.

The shear pin 68 is arranged between the end portion 18 of the shaft 14 and the trailing end 34 of the coupling 10. The shear pin 68 prevents the end coupling 10 from winding off, or further on, the shaft end 14. To locate the shear pin 68 in this position, the coupling 10 is mounted to the shaft 14 prior to installation in the bore 20. The shaft 14 of the rock bolt 12 is screwed into the coupling 10 until it reaches a first position. The first position is such that rotation of the end coupling in one direction relative to the shaft allows for tensioning of rock bolt when installed by relative axial movement between the end coupling and the rock bolt shaft. The shear pin is then positioned in the coupling and the shaft (as shown in FIG. 5).

Figure 6:
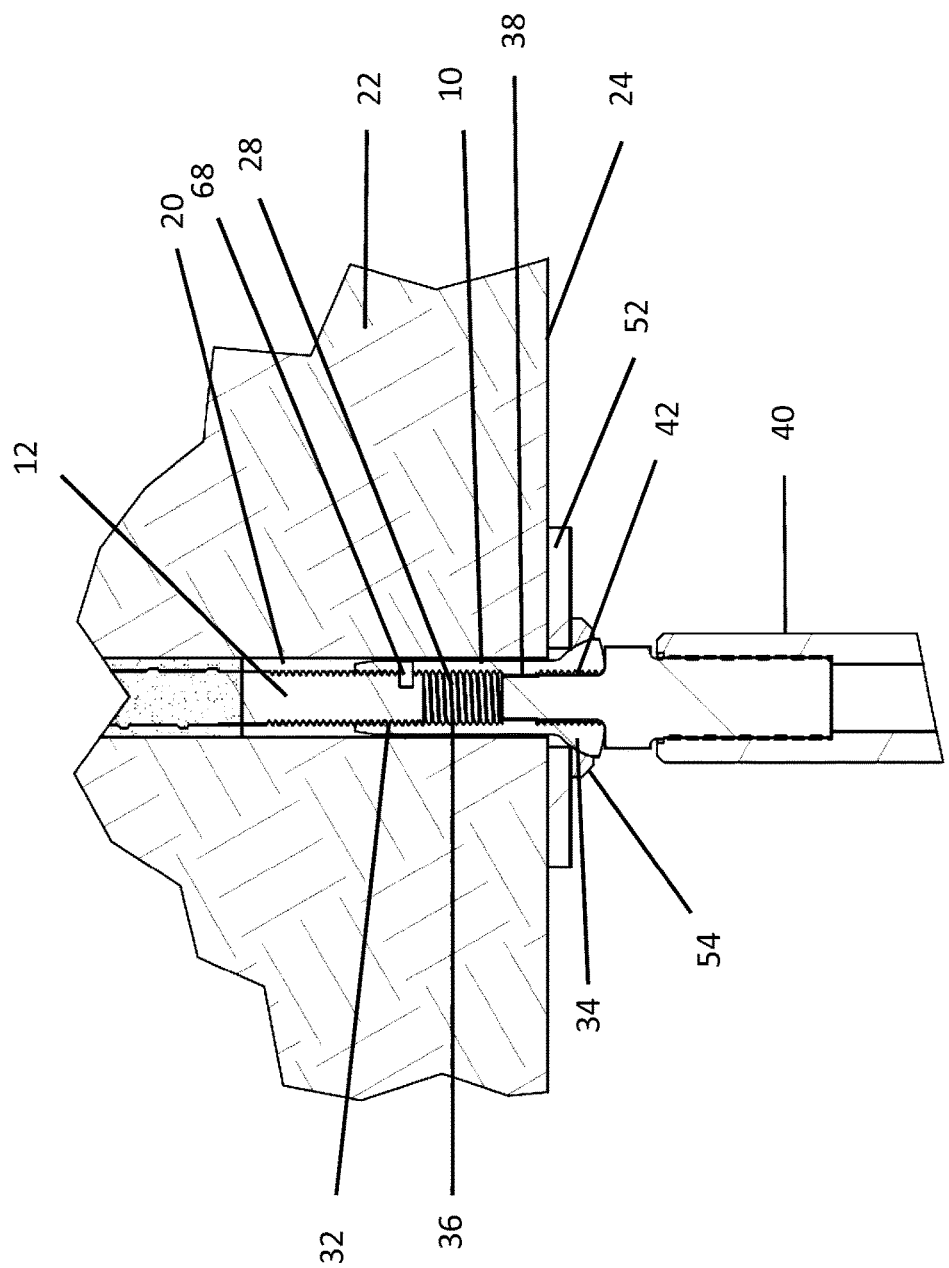
FIG. 6 is a cross-sectional view of the rock bolt assembly of FIG. 4 in installation.

Referring to FIG. 6, the drive 40 is shown in use with the assembly 100. The drive 40 is inserted into the second passage portion 30 via the trailing end 34 to impart rotation to the shaft 14 of the rock bolt 12. The drive 40 rotates the coupling 10 in the first direction by engaging the drive receiving portion 38. The drive 40 imparts corresponding rotation to the shaft 14 which can be used to activate a point anchor of the rock bolt (not shown) which may be either a mechanical anchor and/or a resin cartridge.

After activation of the point anchor the rock bolt 12 is ready to be tensioned as it is prevented from rotation within the bore by the active point anchor. At this stage, rotation applied to the coupling via the drive 40 imparts a toque to the shaft and therefore the shear pin as the shaft is prevented from rotating by the point anchor. This drive causes the threshold torque to be reached thus the shear pin 68 is designed to break allowing relative rotation between the coupling 10 and the shaft 14. Once the shear pin is broken, continued rotation of the coupling causes the coupling 10 to wind up the end portion 18 of the shaft 14 (as a result of engagement between the thread 16 on the shaft and the first passage thread 36 in the coupling 10). This causes the plate 54, the abutment surface 64 of the washer and the abutment arrangement 48 of the coupling 10 to move into forced engagement with the rock face 102 thereby placing the shaft 14 in tension. Rock support is therefore achieved.

Figure 7:
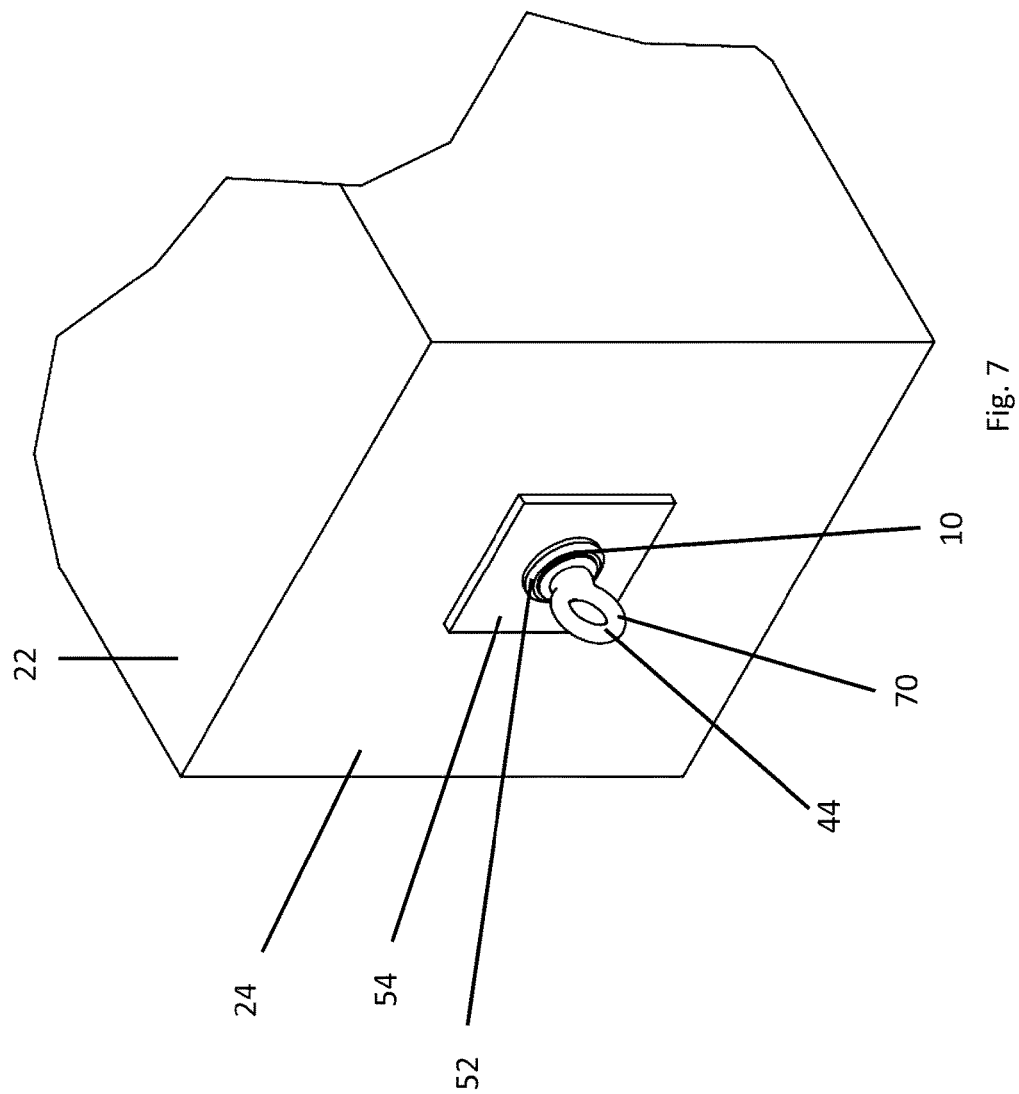
FIG. 7 is an isometric view of the rock bolt assembly of FIG. 4 in use and a hanger coupling attached thereto.
Figure 8:
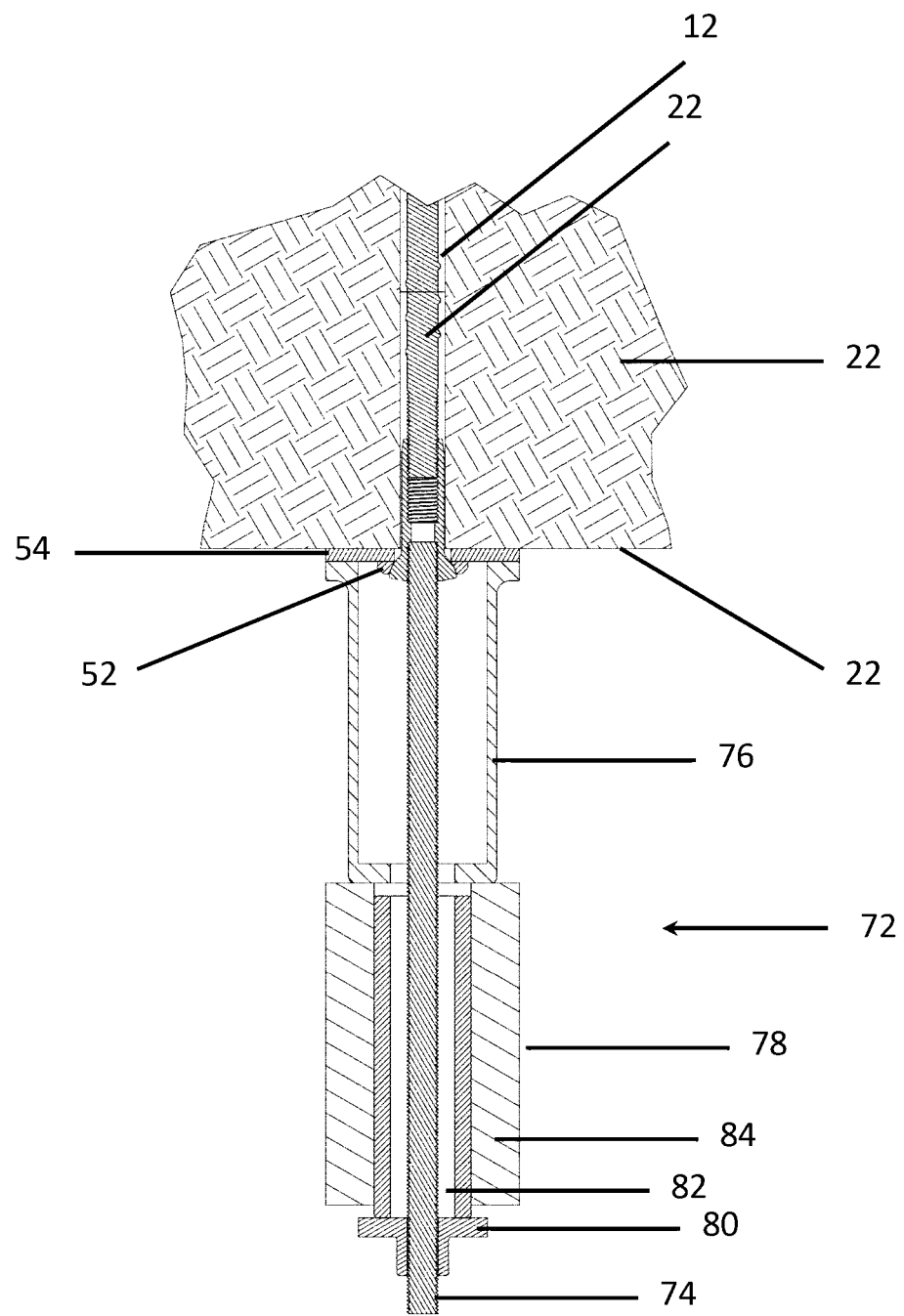
FIG. 8 is a cross-sectional view of the rock bolt assembly of FIG. 5 in use and a load testing device attached thereto.

In addition to supporting the rock strata, the coupling can be used to locate an attachment 44 as shown in FIGS. 7 and 8. Typically the attachment 44 is in the form of hanging loops, brackets or the like which are often required in mining applications to support mine services.

FIG. 7 illustrates the attachment in the form of a hanger 70. The hanger 70 allows mining services to be attached to the rock bolt assembly. For example, the coupling may be used to hang power or water lines. In particular the second passage portion 30 of the coupling 10 includes an internal thread 42 which extends to the trailing end 34. The hanger 70 has an external thread 46 which may be secured to the trailing end 34 of the coupling 10 by engagement of the threads 38 and 46. By locating the attachment 44 in the end 34 of the coupling 10 a simple means of securing the attachment 44 to the rock bolt assembly 100 is achieved.

FIG. 8 illustrates the attachment in the form of a load testing apparatus 72. The load testing apparatus may also be referred to as a pull test assembly 72. The pull test assembly 72 includes a pull stem 74, a spacer 76, a hydraulic ram 78, and back nut 80. The pull test assembly 72 checks the quality of ground support provided by the rock bolt assembly 100. In general, the assembly 72 hydraulically pulls the rock bolt 12 to measure the displacement of the rock bolt 12.

The pull stem 74 has an external thread 46 which may be secured to the trailing end 34 of the coupling 10 by engagement of the threads 38 and 46. The spacer 68 fits over the end fittings of the bolt, namely the plate 54, the washer 52, the end coupling 10, and the pull stem 74. The hydraulic ram 70 is placed over the pull stem 74. The back nut 80 is screwed onto the end of the pull stem 74 protruding behind the hydraulic ram 78. The hydraulic ram 78 includes an inner cylinder 82 and an outer cylinder 84.

To pull test the rock bolt assembly 100, the inner cylinder 82 of the hydraulic ram 78 is extended out using a hydraulic pump. The inner cylinder 82 loads against the back nut 80, which is attached to the pull stem 74. This transfers tensile load to the coupling 10 and the rock bolt 12. The reaction force from the back nut 80 is counteracted by the outer cylinder 84 of the ram 78, which is forced against the spacer 76 and indirectly the surface of the rock substrate. The net result is the progressive loading of the bolt 12, typically up to 75-80% of the bolt yield strength. The displacement of the bolt can also be measured during testing by using a displacement dial indicator resting against the end of the pull stem 66.

Figure 9:
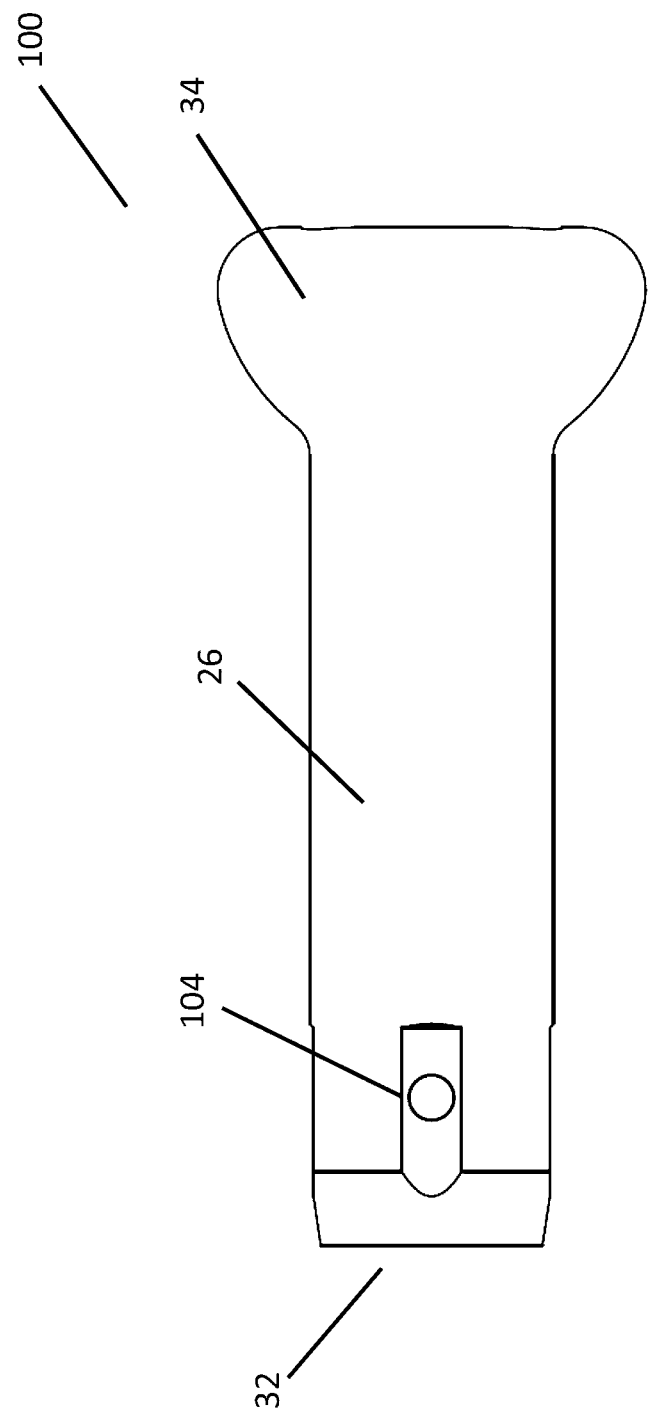
FIG. 9 is an side view of a second embodiment of an end coupling.
Figure 10:
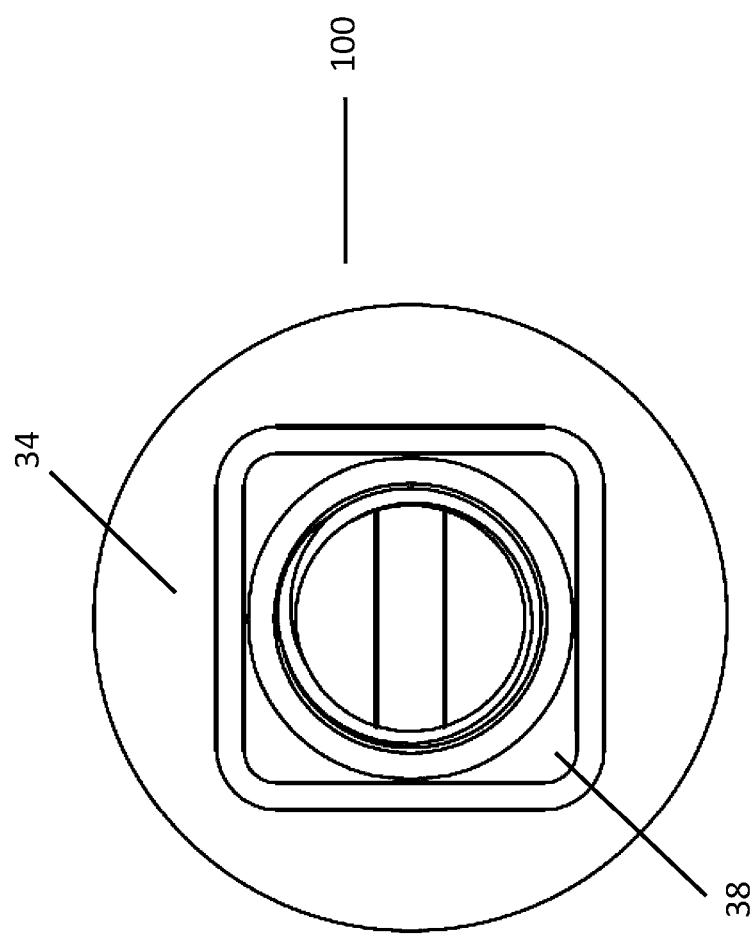
FIG. 10 is a trailing end view of the end coupling of FIG. 9.
Figure 11:
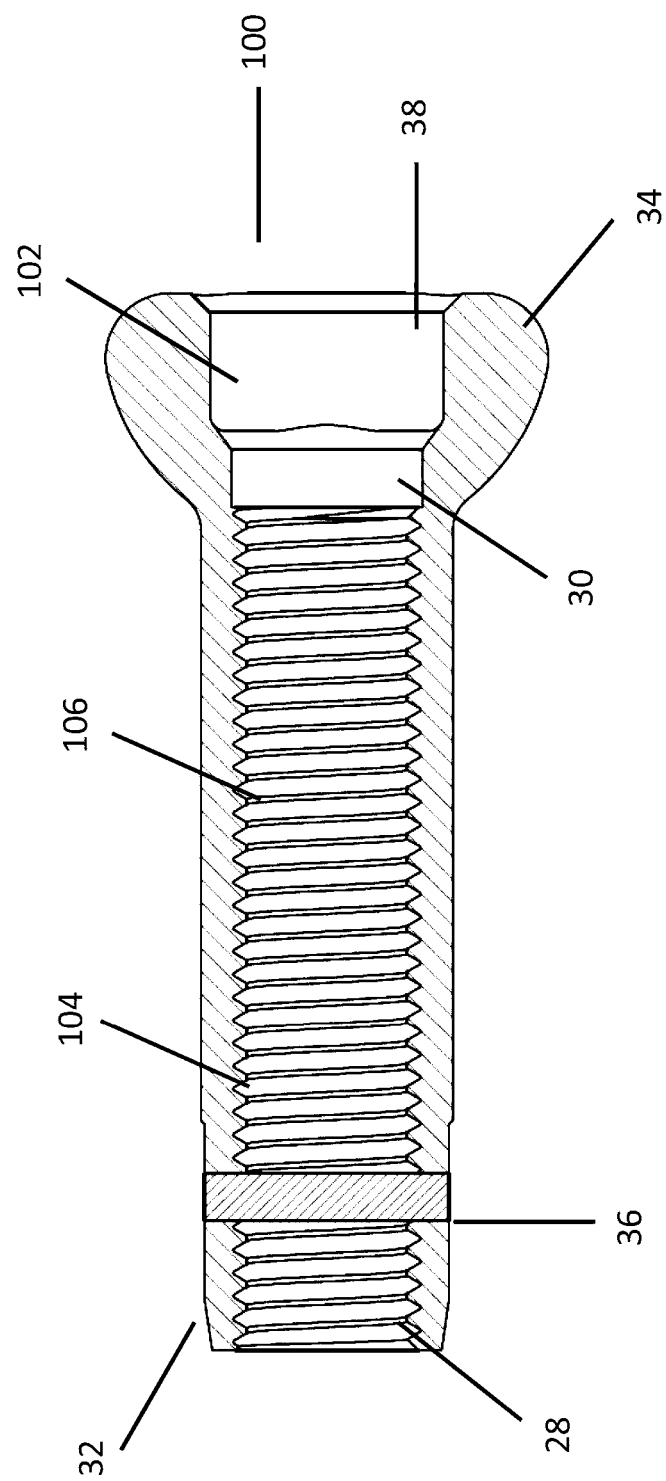
FIG. 11 is a cross-sectional view of the end coupling of FIG. 9.

FIGS. 9 to 11, illustrate a further embodiment of coupling 100. As the coupling 100 has many of the features of the coupling 10, like features have been given like reference numerals.

A primary distinguishing feature of the coupling 100 as compared to coupling 10 is that the drive receiving portion 38 is positioned at the trailing end 34 rather than intermediate the coupling as in the earlier embodiment. In the illustrated form, the driving receiving portion, shown as a square drive socket, is formed in an enlarged portion 102 of the second passage portion 30 that extends to the trailing end 34. This arrangement allows the drive (not shown) to have a larger shaft size as compared to the earlier embodiment where the drive shaft needed to extend through the second thread portion 42. The large drive receiving portion 34 improves the torque capacity of the drive 40 and coupling 100.

Also in the embodiment as shown in FIGS. 9-11, a shear pin 104 extends across the first passage portion 28. This forms an obstruction in the first passage portion 28 which is arranged to engage with the end of the rock bolt shaft when the coupling 100 is screwed onto the shaft end. With this engagement, further rotation of the coupling in the same direction causes rotation of the shaft thereby allowing the shaft to be spun (typically to point anchor the rock bolt) under operation of the drive. Once the rock bolt is restrained from rotation by point anchoring, further rotation of the coupling causes the coupling to further wind up the shaft (as the shaft is prevented from rotating). This induces loading on the shear pin to a threshold load where it fails in shear, thereby freeing the coupling to wind further up the shaft to thereby allow tensioning of the rock bolt.

Finally, in the coupling 100, the internal thread 106 is continuous from the leading end to the driving receiving portion 38. In this regard a first portion of the thread 106 towards the leading end 32 forms the first threaded portion 36 whereas a second portion of the thread 106 near the trailing end 34 forms the second threaded portion 42.

Accordingly, an end coupling and rock bolt assembly is provided which allows for both the transfer of torque and tensioning of rock bolts for use in mining and similar applications. Furthermore, in at least one form, the coupling is multifunctional and also provides an arrangement to allow easier fitting of related attachments for use in such operations.

It is to be understood that a reference herein to a prior art document does not constitute an admission that the document forms part of the common general knowledge in the art in Australia or in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An end coupling for a rock bolt having a shaft having an external thread, the coupling having an axis and the coupling comprising:
    a body having a leading end and a trailing end spaced apart along the axis,
    a first passage portion extending along the axis from the leading end;
    a second passage portion extending along the axis from the trailing end;
    the first passage portion defined in the body and including a first thread portion to threadingly engage the external thread on the shaft of the rock bolt;
    the second passage portion defined in the body and including a drive receiving portion arranged to be engaged with a drive inserted into the second passage portion via the trailing end to impart rotation to the coupling about the axis,
    wherein the second passage portion includes a second thread portion arranged to receive an attachment with a complementary thread received in the trailing end to threadingly engage the attachment to the end coupling, and
    wherein the drive receiving portion is defined inside of the body between the first thread portion and the second thread portion.

2. The end coupling according to claim 1, wherein the second thread portion is disposed intermediate the drive receiving portion and the trailing end.

3. The end coupling according to claim 1, wherein the drive receiving portion is disposed radially inwardly of the second thread portion.

4. The end coupling according to claim 1, wherein the second thread portion extends to the trailing end.

5. The end coupling according to claim 1, wherein the driving receiving portion is disposed at or adjacent the trailing end.

6. The end coupling according to claim 1, wherein the first and second passage portions are interconnected to form a continuous passage between the leading and trailing ends of the body.

7. The end coupling according to claim 1, wherein the drive receiving portion is in the form of an internal hex.

8. The end coupling according to claim 1, further comprising an abutment arrangement disposed on the body and forming an external abutment surface that faces the leading end.

9. The end coupling according to claim 8, wherein the abutment arrangement is disposed at or proximate the trailing end and forms an enlarged head on the body.

10. The end coupling according to claim 8, further comprising a washer that is receivable on the body and arranged to locate against the abutment arrangement.

11. The end coupling according to claim 8, wherein the abutment arrangement includes a bevelled surface that faces the leading end.

12. The end coupling according to claim 8, wherein the abutment arrangement is integrally formed with the body.

13. The end coupling according to claim 1, further comprising a torque transfer arrangement that is arranged to allow a threshold torque to be applied to the shaft through the coupling without inducing relative rotation between the coupling and the shaft.

14. The end coupling according to claim 13, wherein the torque transfer arrangement is in the form of shear pin.

15. A rock bolt assembly comprising:
    a rock bolt having a shaft having an external thread; and
    an end coupling according to claim 1, an end of the rock bolt disposed in the first passage portion and threadingly engaged with end coupling.

16. The rock bolt assembly according to claim 15, further comprising a torque transfer arrangement arranged to allow a threshold torque to be applied to the shaft through the coupling without inducing relative rotation between the coupling and the shaft.

17. The rock bolt assembly according to claim 16, wherein the torque transfer arrangement is in the form of shear pin extending between the coupling and the rock bolt shaft.

18. The rock bolt assembly according to claim 16, wherein the torque transfer arrangement is in the form of a sheer pin that extends across the first passage portion.

19. The rock bolt assembly according to claim 16, wherein the rock bolt is threadingly engaged with the end coupling such that when in a first position, rotation of the end coupling in one direction relative to the shaft allows for tensioning of rock bolt when installed by relative axial movement between the end coupling and the rock bolt shaft.

* * * * *